M. M. McINTYRE.
VEHICLE SPRING.
APPLICATION FILED JUNE 2, 1906.
911,151.
Patented Feb. 2, 1909.
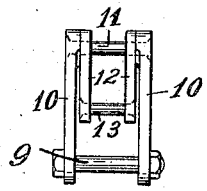
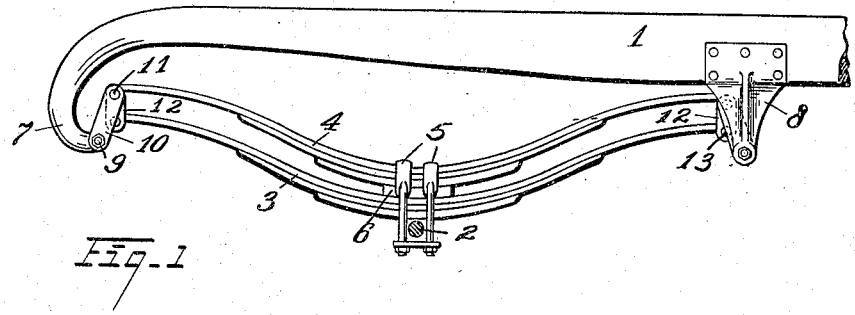
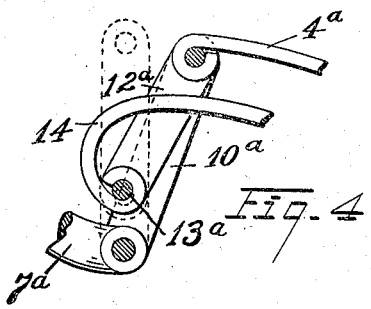
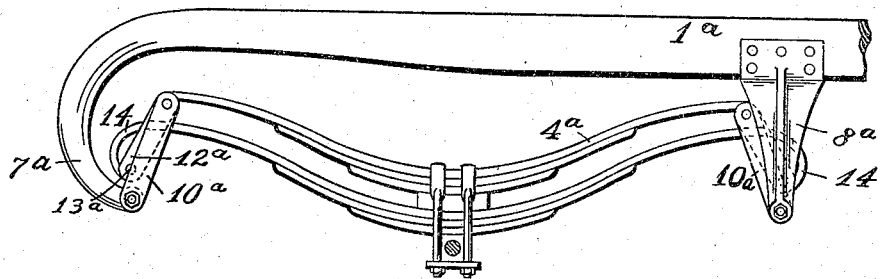
WITNESSES:
INVENTOR,
Michael M. McIntyre
BY
Bates, Fouts & Hull
ATTYS.

UNITED STATES PATENT OFFICE.

MICHAEL M. McINTYRE, OF CLEVELAND, OHIO, ASSIGNOR TO THE PERFECTION SPRING COMPANY, OF CLEVELAND, OHIO, A CORPORATION OF OHIO.

VEHICLE-SPRING.

No. 911,151.

Specification of Letters Patent.

Patented Feb. 2, 1909.

Application filed June 2, 1906. Serial No. 319,815.

*To all whom it may concern:*

Be it known that I, MICHAEL M. McINTYRE, a citizen of the United States, residing at Cleveland, in the county of Cuyahoga and State of Ohio, have invented a certain new and useful Improvement in Vehicle-Springs, of which the following is a full, clear, and exact description, reference being had to the accompanying drawings.

My invention relates to vehicle springs, and has for its object to so construct and connect said springs as to secure ease of riding and permit the longitudinal swaying or movement of the body with respect to the axle without detrimental effect upon the springs, as well as to provide means whereby the members of a multiple spring, that is to say a spring composed of two or more spring members, may be connected in such manner as to permit relative movement of the end portions thereof without interfering with each other and to permit such relative movement between the spring members as well as relative movement between such spring members and the body of the vehicle.

A further object of the invention is to provide a form of connection between the ends of double or multiple springs and the hangers of vehicles that will permit of the relative movement of the ends of the component members of such springs with the employment of relatively short hangers for supporting the ends of said members, combining free movement of the ends of the spring members with compactness of construction.

I accomplish these results by the construction described herein, illustrated in detail in the drawings, and embodied in the claims hereto annexed.

Referring to the drawings, Figure 1 represents a side elevation of a portion of the vehicle frame showing my invention applied thereto; Fig. 2 represents a similar view, showing the manner in which my invention may be applied to a different combination of spring members from that shown in Fig. 1; Fig. 3 represents an enlarged detail of one of the double links or shackles by which the ends of the spring members in Fig. 1 are connected to the vehicle frame; and Fig. 4 a sectional detail of the double links or shackles shown in Fig. 2, the portions of the parts when the springs are deflected being indicated in dotted lines.

Describing the parts by reference characters, 1 represents a portion of the frame of the vehicle, as, for instance, a portion of the side frame of an automobile.

2 represents the axle of the vehicle, and 3 and 4 represent a pair of spring members clamped together at their middle portions and to the axle by means of clips 5. I preferably space the middle portions of said spring apart by means of a spacer 6.

One end of the frame member 1 comprises a hanger 7, said hanger being curved downwardly and inwardly as is customary in automobile construction.

8 designates one of a pair of hanger plates secured to the frame and projecting downwardly therefrom.

The lower end of the hanger 7 terminates in an eye through which extends a bolt 9, said bolt forming a pivot for the lower ends of the side links 10 of a long shackle. The upper ends of the links 10 are bored for the reception of a bolt or pin 11, said bolt or pin also extending through the upper ends of a pair of short side links 12 of a shorter shackle, the shorter shackle being pivoted at its upper end preferably within the longer shackle by means of the pin 11, common to both of said shackles. A similar pair of long and short shackles is provided for the hanger plates 8, the lower ends of the side links of the long shackle being pivoted to and between said plates.

Each end of the upper spring member 4 is provided with the usual eye, which embraces the pin or bolt 11, whereby said member is pivotally connected to the frame 1 (through the hangers 7 and 8) by means of the long shackle. Each end of the lower spring member 3 is connected in like manner to the pin 13, uniting the lower ends of the side links 12 of the short shackle.

The construction above described is particularly useful in connection with the rear axle of an automobile having a radius rod. As is well known in the automobile industry, such radius rods are provided for chain-driven automobiles for the purpose of keeping the chain taut during the vertical swaying of the body, and to prevent the axle from turning on a horizontal pivot, the action being to move the axle back and forth according as the body is depressed or elevated. The use of the long shackle as a means of connecting the spring construction as an entity to the vehicle frame permits this backward and forward movement of the axle relatively to the body, without subjecting the spring ends to any strain other than that to which they would be subjected by the rising and falling of the body. At the same time, owing to the provision of the short shackle and the manner of supporting the same, the ends of each spring member are free to elongate or contract, irrespective of the action of the ends of the other spring member.

The construction shown in Fig. 1 is useful in attaching and applying springs to frames having short hangers, as is the case with certain makes of automobiles of recent construction as well as with other makes of older construction. In this case, the spring members are preferably the ordinary semi-elliptical spring members, the combined strength of said members being sufficient to carry the vehicle and its load, and the ends being sufficiently flexible or tender to secure ease of riding.

In the case of frames wherein longer hangers are provided, I may employ the construction shown in Fig. 2, wherein the lower spring member is of the "scroll" type; that is to say, the ends of the lower spring member are formed into scrolls which project through the shorter shackles and are connected at their lower ends to the lower ends of said shorter shackles to the pins or bolts provided for such purpose. In this figure, 4ª denotes the upper spring section, and 7ª and 8ª the hangers. These hangers, as before stated, are considerably longer than those shown in Fig. 1, and can accommodate between the lower ends thereof and the lower surface of the frame 1ª shackles having longer side links 10ª than is the case with the construction shown in Fig. 1. The side links 12ª of the shorter shackles are of sufficient length to permit the passage of the scroll 14 between the upper and lower pivot pins or bolts, and to provide sufficient room to accommodate any vertical expansion in said scroll. The lower end of the scroll is curved inwardly and connected to the pin or bolt 13ª, which connects the lower ends of the side links 12ª.

As a means for permitting relative longitudinal movement of the ends of the spring members and at the same time a bodily movement of the springs and axle with respect to the vehicle frame and hangers, I consider the hereindescribed form of connections between the ends of the spring members and between such members and the frame to be of great advantage, as it effectively answers the purpose for which it is designed, and accomplishes the same in a particularly compact and effective embodiment.

It will be observed that the ends of the upper spring member are connected to the upper ends of both the short and long shackles, by virtue of the fact that the pin 11 extends through both said shackles.

Having thus described my invention, I claim:

1. The combination, with the frame and axle of a vehicle, of a pair of spring members secured to said axle, and means for flexibly connecting said members to said frame, said means comprising a hanger projecting from said frame, a link pivoted at one end to said hanger and extending therefrom, a shorter link pivotally connected with the upper portion of the former link, and pivotal connections between the upper end of the long link and the lower end of the shorter link and the adjacent ends of the spring members respectively; substantially as specified.

2. The combination, with the frame and axle of a vehicle, of a pair of spring members secured to said axle, and means for flexibly connecting said members to said frame, said means comprising a pair of hangers, a long shackle pivotally connected to each of said hangers, a short shackle pivoted to and swinging within the long shackle, and pivotal connections between the short shackle and the adjacent ends of the spring members, substantially as specified.

3. The combination, with the frame and axle of a vehicle, of a pair of spring members secured to said axle, and means for flexibly connecting said members to said frame, said means comprising a pair of hangers, a long shackle pivotally connected at one end to each of said hangers, a short shackle pivoted at its upper end to the upper end of the long shackle, and pivotal connections between the ends of such short shackle and the adjacent ends of the spring members, substantially as specified.

4. The combination, with the frame and axle of a vehicle, of a pair of spring members secured to said axle, a hanger carried by said frame, a long shackle pivotally supported from said hanger, a short shackle pivoted within the long shackle, a connection between an end of one of said spring members and the pivot of said short shackle, the other spring being provided with a scroll and connected to the short shackle adjacent the free end thereof, substantially as specified.

5. The combination, with the frame and axle of a vehicle, of a pair of spring members secured to said axle, a hanger carried by said frame, a long shackle pivotally supported at one end thereof from said hanger, a short shackle pivoted within the long shackle, a connection between an end of the upper spring member and the pivot of said short shackle, the lower spring being provided with a scroll end connected to the free end of said short shackle, substantially as specified.

6. The combination, with the axle, frame and hangers of a vehicle, of a pair of spring members connected together and to said axle, one of said spring members being provided with scroll ends, a long shackle pivoted at its lower end to each of said hangers, and a short shackle pivoted at its upper end within the long shackle, and pivotal connections between the ends of the spring members and each of the ends of the short shackles, substantially as specified.

7. The combination, with the axle, frame and hangers of a vehicle, of a pair of spring members connected together and to said axle, the lower of said spring members being provided with scroll ends, a long shackle pivoted at its lower end to each of said hangers, and a short shackle pivoted at its upper end within the long shackle, the ends of the upper spring member being connected to the pivots of the short shackles, and the ends of the lower spring extending through the short shackles and having their lower ends connected to the lower ends of the short shackles, substantially as specified.

8. The combination, with the frame and axle of a vehicle, said frame comprising hangers, a long shackle connected at its lower end with each of said hangers and projecting upwardly therefrom, a short shackle having its upper end pivoted within the upper end of the long shackle, a pair of spring members connected together and to the vehicle axle, the upper member having its ends connected to the upper ends of the short shackles and the lower member having its ends connected to the lower ends of the short shackles, substantially as specified.

9. The combination, with the frame and axle of a vehicle, said frame comprising hangers, a long shackle connected at its lower end with each of said hangers and projecting upwardly therefrom, a short shackle pivoted within the upper end of the long shackle, a pair of spring members connected together and to the vehicle axle, the upper member having its ends connected to the pivots of the short shackles, and the lower member having its ends connected adjacent to the lower ends of the short shackles, substantially as specified.

10. The combination, with the frame and axle of a vehicle, of a pair of spring members secured to said axle, and means for connecting said members to said frame, said means comprising a long shackle pivotally supported from said frame, a shorter shackle pivoted to and swinging within the long shackle, and connections between the ends of said spring members and the ends of said shorter shackle, substantially as specified.

11. The combination, with the frame and axle of a vehicle, of a pair of spring members secured to said axle, and means for connecting said members to said frame, said means comprising a long shackle pivotally supported from said frame, a shorter shackle pivoted to and swinging within the long shackle, a connection between an end of one of said spring members and the pivot of the shorter shackle, and a connection between an end of the other spring member and the free end of said shorter link, substantially as specified.

12. The combination, with the frame and axle of a vehicle, of a pair of spring members secured to said axle, and means for flexibly connecting said members to the frame, said means comprising a hanger, a long shackle pivotally connected to the hanger, a short shackle extending in the same direction from the hanger as the long shackle and swinging within the long shackle, a pivotal connection between the free end of each long shackle and the adjacent end of one spring member and a pivotal connection between the free end of each short shackle and the adjacent end of the other spring member, substantially of specified.

13. The combination, with the frame and axle of a vehicle, of a pair of spring members secured to said axle, and means for flexibly connecting said members to the frame, said means comprising a pair of hangers, a long shackle pivotally connected to each of said hangers, a short shackle extending in the same direction from each of said hangers as the corresponding long shackle and swinging within each of said long shackles, a pivotal connection between the free end of each long shackle and the adjacent end of one spring member and a pivotal connection between the free end of each short shackle and the adjacent end of the other spring member, substantially as specified.

14. The combination, with the frame and axle of a vehicle, of a pair of spring members secured to said axle, one of said members being provided with a scroll end, a hanger carried by said frame, a long shackle pivotally supported from said hanger, a short shackle swinging within the long shackle, a connection between the free end of the short shackle and the end of the spring member having the scroll, and a connection between the free end of the long shackle and the end of the other spring member, substantially as specified.

In testimony whereof, I hereunto affix my signature in the presence of two witnesses.

MICHAEL M. McINTYRE.

Witnesses:
J. B. HULL,
S. E. FOUTS.